United States Patent Office 3,123,460
Patented Mar. 3, 1964

3,123,460
METHOD FOR COMBATING WEEDS
Werner Schäfer, Cologne-Stammheim, Richard Wegler, Leverkusen, and Ludwig Eue, Cologne-Mulheim, Germany, assignors to Farbenfabriken Bayer Aktiengesellschaft, Leverkusen, Germany, a corporation of Germany
No Drawing. Filed Jan. 26, 1960, Ser. No. 4,624
Claims priority, application Germany Feb. 3, 1959
5 Claims. (Cl. 71—2.3)

The present invention relates to and has as its objects herbicides whose active substance are imido esters or imido thioesters. The active compounds may generally be illustrated by the following formula

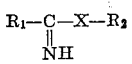

in which X denotes an oxygen or sulfur atom, $R_1$ denotes a lower aliphatic radical up to 4 carbon atoms, and in which some or all hydrogen atoms are substituted by halogen, and $R_2$ denotes a possibly substituted alkyl, alkenyl or alkinyl radical.

The present invention also relates to a method of combating weeds or controlling their growth by using the above shown compounds.

Various substances are known as yet to control the growth of weeds or to destroy them completely. One group of compounds especially used for this purpose consists of plant growth hormones, especially of the series of substituted phenoxy lower alkenoic acids. Other compounds to combat weeds either selectively or completely are such substances which cause destruction because of their phytotoxic properties or the like.

In accordance with this invention it has now been found that compounds of the above shown formula are herbicidal; the invention is more particularly concerned with those compounds of the following formula

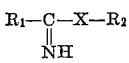

in which X denotes oxygen or sulfur, $R_1$ denotes a lower aliphatic radical up to 4 carbon atoms such as methyl, ethyl or propyl, in which some or all hydrogen atoms are substituted by halogen as, for example, trichloromethyl, dichloromethyl or the $\alpha,\alpha$-dichloropropionyl radical, and $R_2$ denotes a possibly substituted alkyl, alkenyl or alkinyl radical, or An alkyl radical in which some of the hydrogen atoms are substituted by halogen, or An alkyl radical which is substituted by hydroxyl groups or amino groups, or An alkyl radical which is substituted by alkoxy groups, or An alkyl radical, which is substituted by phenoxy groups which may be further substituted in the nucleus by halogen atoms, or An alkyl radical which is substituted by aromatic or heterocyclic radicals, or An alkyl radical which includes hetero atoms such as nitrogen, sulfur or oxygen, or An alkyl radical which is substituted by hydroxyl groups which may also be acylated. The aliphatic acyl radicals may be further substituted by halogen atoms or carboxyl groups. They may also be unsaturated. These hydroxyl groups may likewise be acylated by aromatic radicals which are substituted in the nucleus by halogen, nitro, carboxyl or alkoxy groups. The hydroxyl groups may also be acylated, for example, by carbamic acids, formic acid esters or an alkyl radical substituted by hydroxyl groups which may be converted into the semiacetal form by the addition of chloral, or An alkyl radical substituted by hydroxyl groups which may be converted into urethanes, for example, by isocyanates.

The compounds of this class are obtainable from aliphatic halogenated nitriles and the corresponding alcohols, according to W. Steinkopf, Ber. 40 (1907), page 1643, or by an improved method, according to F. Cramer, K. Pawelzik and H. J. Baldauf, Ber. 91 (1958), page 1049, from halogenated aliphatic nitriles, the corresponding alcohol and basic catalysts such as potassium carbonate or sodium alcoholates. Some of the inventively used compounds are known from the literature, others which are not known as yet may be prepared strictly in accordance to those methods for preparing known compounds of the inventively used type.

The imido esters or their derivatives described above are intended to be used as herbicides, and as weeds in the widest sense of the present application there are to be understood plants which grow in places where they are undesired. It has been found that germinating seeds are completely prevented from further germination, or that seedlings are damaged to such an extent that they die.

It has further been found that the germination-inhibiting or damaging action is chiefly directed against gramina so that the compounds may be used as selective herbicides.

The weeds are destroyed before growth by a treatment of the soil, or early in spring by the use of the compounds as total herbicides. When the compounds are used as selective herbicides the treatment of the cultivated plants is carried out after sowing.

The agents are applied with a liquid or solid diluent or extender. Solid extenders are preferably talc, chalk, bentonite, kieselguhr, clay, silicate and the like. Liquid dilutions or solvents are especially water, together with suitable auxiliary solvents and emulsifying agents. An addition of conventional herbicides or fertilizers is possible or even desirable. If used in the form of aqueous or oily dispersions, emulsions or solutions they may contain wetting agents, emulsifiers or other dispersing agents, especially those of non-ionic type such as aryl-hydroxy polyglycol ethers.

The solutions used in the examples are prepared with the aid of auxiliary solubilizing agents such as acetone or dimethyl formamide, emulsifier (non-ionic emulsifiers such as benzyl-hydroxy-diphenyl polyglycol ether) and water.

The following examples are given for the purpose of illustrating the present invention:

*Example 1*

In green-house tests mixed mustard and oath sowings were sprayed with 0.2%, 0.1% and 0.05% solutions 24 hours after sowing the solutions were prepared as said above, i.e. by mixing the active substances with twice their amount of acetone as auxiliary solvent and the same amount of nonylphenol polyglycol ether as emulsifier. The compounds were diluted to the concentration shown above. 100 mg., 50 mg. and 25 mg. of active substance were used per 100 square centimeter. Three weeks after the treatment the pots were evaluated. This evaluation is based on 4 grades of damage.

| Compound | Mustard-oat, 100 mg. | | Pre-emergence | | | |
|---|---|---|---|---|---|---|
| | | | 50 mg. | | 25 mg. | |
| | m | o | m | o | m | o |
| $Cl_3C-\underset{NH}{\overset{\parallel}{C}}-OCH_3$ | 2-3 | 3 | 2-3 | 3 | 1 | 2-3 |
| $H_3C-CCl_2-\underset{NH}{\overset{\parallel}{C}}-OCH_3$ | 3 | 3 | 1-2 | 3 | 1-2 | 3 |
| $Cl_3C-\underset{NH}{\overset{\parallel}{C}}-O-CH(CH_3)_2$ | 1-2 | 2 | 0 | 1 | 0 | 0 |
| $Cl_3C-\underset{NH}{\overset{\parallel}{C}}-O-CH_2-CCl_3$ | 1 | 3 | 1 | 2-3 | 0 | 2-3 |
| $Cl_3C-\underset{NH}{\overset{\parallel}{C}}-O-CH_2-CH_2-Cl$ | 2-3 | 2 | 2 | 1 | 1 | 1 |
| $Cl_3C-\underset{NH}{\overset{\parallel}{C}}-O-CH_2-CH=CH_2$ | 3 | 3 | 1-2 | 2-3 | 0 | 1-2 |
| $Cl_3C-\underset{NH}{\overset{\parallel}{C}}-O-CH_2-CH_2-OH$ | 1 | 3 | 0-1 | 3 | 0-1 | 3 |
| $Cl_3C-\underset{NH}{\overset{\parallel}{C}}-O-CH_2-\underset{OH}{CH}-CH_2-OH$ | 1 | 2 | 0 | 1-2 | 0 | 0-1 |
| $Cl_3C-\underset{NH}{\overset{\parallel}{C}}-O-CH_2-CH_2-O-C_6H_5$ | 2-3 | 3 | 2 | 3 | 2 | 3 |
| $Cl_3C-\underset{NH}{\overset{\parallel}{C}}-O-CH_2-CH_2-O-C_6H_4-Cl$ | 3 | 3 | 3 | 3 | 3 | 2-3 |
| $Cl_3C-\underset{NH}{\overset{\parallel}{C}}-O-CH_2-CH_2-O-C_6H_4-Cl$ | 3 | 3 | 3 | 2-3 | 3 | 2-3 |
| $Cl_2CH-\underset{NH}{\overset{\parallel}{C}}-O-CH_2-CH_2-O-C_6H_4-Cl$ (with extra Cl) | 3 | 1-2 | 3 | 1 | 3 | 0 |
| $Cl_3C-\underset{NH}{\overset{\parallel}{C}}-O-CH_2-CH_2-O-\underset{O}{\overset{\parallel}{C}}-CH_2-Cl$ | 3 | 2-3 | 1-2 | 1-2 | 0 | 0 |
| $Cl_3C-\underset{NH}{\overset{\parallel}{C}}-O-CH_2-CH_2-O-\underset{O}{\overset{\parallel}{C}}-CCl_3$ | 2 | 2 | 0-1 | 0-1 | 0-1 | 0-1 |
| $Cl_3C-\underset{NH}{\overset{\parallel}{C}}-O-CH_2-CH_2-O-\underset{O}{\overset{\parallel}{C}}-CH=CH-COOH$ | 1 | 1 | 0 | 0 | 0 | 0 |
| $Cl_3C-\underset{NH}{\overset{\parallel}{C}}-O-CH_2-CH_2-O-\underset{O}{\overset{\parallel}{C}}-C_6H_3Cl_2$ | 1 | 0-1 | 0 | 0 | 0 | 0 |
| $Cl_3C-\underset{NH}{\overset{\parallel}{C}}-O-CH_2-CH_2-O-\underset{O}{\overset{\parallel}{C}}-N(CH_3)_2$ | 3 | 2-3 | 1-2 | 2 | 1 | 1-2 |
| $Cl_3C-\underset{NH}{\overset{\parallel}{C}}-O-CH_2-CH_2-O-\underset{OH}{CH}-CCl_3$ | 2 | 3 | 1 | 3 | 0 | 3 |
| $Cl_3C-\underset{NH}{\overset{\parallel}{C}}-O-CH_2-CH_2-O-\underset{O}{\overset{\parallel}{C}}-NH-C_6H_4-Cl$ | 2-3 | 0 | 2 | 0 | 0 | 0 |
| $Cl_3C-C-O-CH_2-C\equiv C-CH_2OH$ | | | 3 | 3 | | |

The figures mean:

0 = no effect
1 = 75% germinated, marked damage to seedlings
2 = less than 50% germinated or severe damage to seedlings
3 = no germination or destroyed after germination The effect of the active substances on seedlings varies as can be seen from the above table. It is further evident that some of the compounds have a pronounced action against germinating grass seeds whilst others are also suitable as total herbicides.

Further active compounds which were tested and also showed a good activity are as follows:

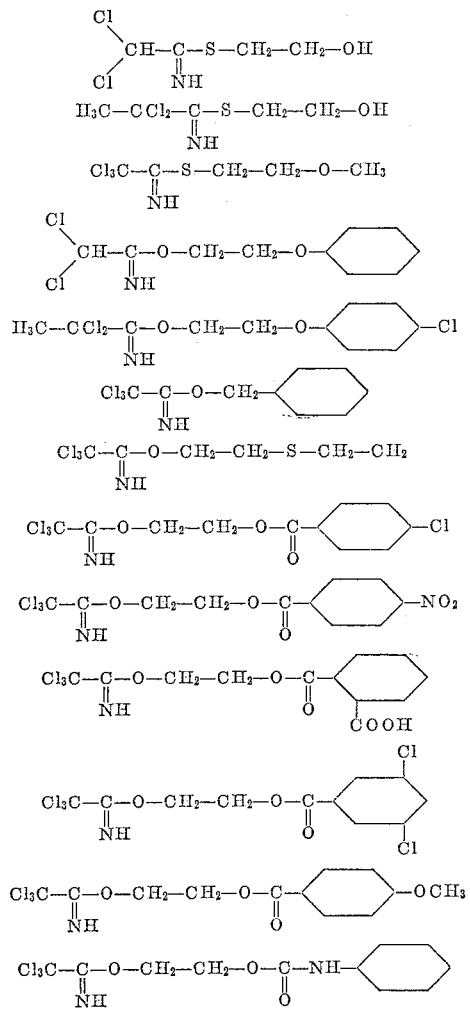

*Example 2*

In the green-house wheat, oat, *Lolium perenne*, beets, onions, cotton and mustard were sown in seedling boxes. 24 hours after sowing, the boxes were sprayed with solutions at varying concentrations (the amount of water remaining the same) using 40 mg., 20 mg. and 4 mg. of active substance per 400 square centimeter. The solutions were prepared as described in Example 1. The result was as follows:

4 weeks after germination, the degree of damage to the seedlings was evaluated (from the day of sowing).

0 = no effect
1 = slight damage
2 = marked damage
3 = strong damage
4 = severe damage, but plants not destroyed
5 = plants completely destroyed The results show that the compounds are suitable for selective weed-killing in the pre-emergence state.

When the compounds used in Example 2 are diluted with kaoline and admixed with the soil before sowing, equal results are attained.

We claim:

1. A method of combating weeds which comprises applying a phytotoxic concentration of a compound of the following formula

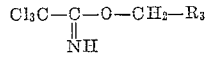

in which $R_3$ stands for a member selected from the group consisting of hydrogen, lower alkyl radical up to 4 carbon atoms, halogen-substituted lower alkyl radical, hydroxyl-substituted lower alkyl radical, lower alkoxy-substituted lower alkyl radical, phenoxy-substituted lower alkyl radical, carboxy-substituted lower alkyl radical, lower alkenyl-substituted lower alkyl radical, and lower alkinyl-substituted lower alkyl radical.

2. A method of combating weeds which comprises applying a phytotoxic concentration of a compound of the following formula

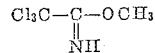

3. A method of combating weeds which comprises applying a phytotoxic concentration of a compound of the following formula

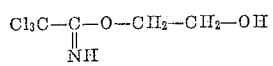

4. A method of combating weeds which comprises applying a phytotoxic concentration of a compound of the following formula

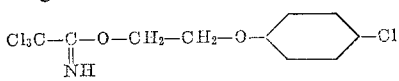

5. A method of combating weeds which comprises applying a phytotoxic concentration of a compound of the following formula

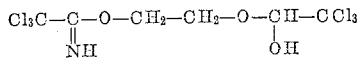

| Compound | Mg. | Wheat | Oat | Beets | Cotten | Mustard | Onions | Lolium |
|---|---|---|---|---|---|---|---|---|
| $CCl_3-C(=NH)-O-CH_2-CCl_3$ | 40 | 5 | 5 | 5 | 2-3 | 2 | 5 | 5 |
| | 20 | 5 | 5 | 4-5 | 2 | 2 | 5 | 5 |
| | 4 | 5 | 5 | 4 | 2-3 | 0 | 3 | 5 |
| $CCl_3-C(=NH)-OCH_3$ | 40 | 5 | 5 | 5 | 3 | 2 | 5 | 5 |
| | 20 | 5 | 5 | 4 | 0 | 0 | 0 | 5 |
| | 4 | 5 | 5 | 4 | 4 | 0 | 0 | 3 |

References Cited in the file of this patent

UNITED STATES PATENTS

| | | |
|---|---|---|
| 2,553,564 | Fein et al. | May 22, 1951 |
| 2,569,425 | Norris | Sept. 25, 1951 |
| 2,841,486 | Osborn et al. | July 1, 1958 |
| 2,846,298 | Osborn et al. | Aug. 5, 1958 |
| 2,898,206 | Monoogian | Aug. 4, 1959 |
| 2,980,734 | Kosmin | Apr. 18, 1961 |

OTHER REFERENCES

Steinkopf: Ber. 40 (1907), p. 1643.
Cramer et al.: Ber. 91 (1958, pp. 1049–1051).